United States Patent
Havinga et al.

[11] 3,719,692
[45] March 6, 1973

[54] NOVEL AMINO-SUBSTITUTED BENZOATES

[75] Inventors: Reginoldus Havinga, Schalkhaar; Pieter D. Swaters, Lochem, both of Netherlands

[73] Assignee: Koninklijke Industrieele Maatschappy Noury & Van der Lande N.V., Deventer, Netherlands

[22] Filed: July 8, 1970

[21] Appl. No.: 53,315

[30] Foreign Application Priority Data

July 24, 1969 Netherlands ....................6911367

[52] U.S. Cl. .......260/404.5, 204/159.18, 260/45.85, 260/470, 260/471 R
[51] Int. Cl............................................C07c 103/32
[58] Field of Search................260/470, 471 R, 404.5

[56] References Cited

OTHER PUBLICATIONS

Warner, R. B., "Synthetic Organic Chemistry," (1967) Pub. by J. Wiley & Sons, Inc., N.Y. (QD262W24) pages 480–482 relied on.

*Primary Examiner*—Lorraine A. Weinberger
*Assistant Examiner*—L. Arnold Thaxton
*Attorney*—Stevens, Davis, Miller & Mosher

[57] ABSTRACT

Ultraviolet light absorbing compounds for polymers and copolymers are disclosed having the general formula:

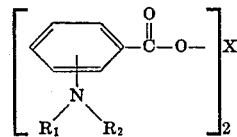

wherein $R_1$ is hydrogen or a lower alkyl group;
  $R_2$ is hydrogen, a lower alkyl group, an acyl group having nor more than 20 carbon atoms, a substituted or non-substituted aroyl group, or a substituted or non-substituted benzene sulfonyl group; and
  X is phenylene or a biphenyl fragment having the formula:

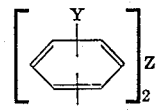

wherein Y represents hydrogen or a halogen, and
  Z is a sulfonyl group or an alkylidene group having from three to eight carbon atoms.

20 Claims, No Drawings

NOVEL AMINO-SUBSTITUTED BENZOATES

This invention relates to novel ultraviolet light absorbing compounds. The invention also relates to processes for the preparation of said compounds and to new compositions stabilized with the novel compounds.

It is well known that under the influence of ultraviolet light polymers such as polyethylene, polypropylene, polyisobutylene, copolymers of ethylene with higher alkenes such as propylene and butylene or with vinyl acetate, polystyrene, polyvinyl chloride, polyvinylidene chloride, copolymers of vinylchloride with vinylidene chloride, polyvinyl acetate, polyester resins, polyurethanes, cellulose derivatives, etc. may degrade which degradation appears from a deterioration of the mechanical properties and/or from the color of the polymer.

It has now been found, according to the present invention, that this degradation of the polymer may be avoided by incorporating in the polymer a stabilizing amount of one or more of the hitherto unknown compounds having the following general formula:

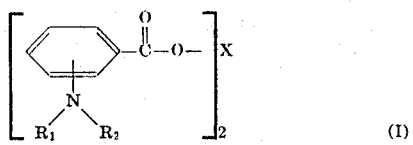

wherein
- $R_1$ hydrogen or a lower alkyl group;
- $R_2$ is hydrogen, a lower alkyl group, an acyl group having not more than 20 carbon atoms, a substituted or non-substituted aroyl group, a substituted or non-substituted benzene sulfonyl group; and
- X is phenylene or a biphenylene fragment having the following structure:

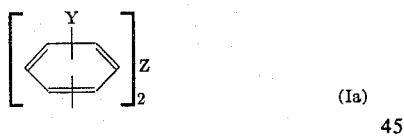

wherein
- Y is hydrogen or a halogen, and
- Z is a sulfonyl group or an alkylidene group having from three to eight carbon atoms.

Examples of novel compounds having the structure (I) are mentioned below in Table A:

TABLE A ( 1) resorcinol di-anthranilate
( 2) resorcinol bis(N-acetylanthranilate)
( 3) resorcinol bis(m-N,N.-dimethylaminobenzoate)
( 4) resorcinol bis(N-benzoylanthranilate)
( 5) resorcinol bis[N-(4-tert.butylbenzoyl)anthranilate]
( 6) resorcinol bis[N-(2-methoxybenzoyl)anthranilate]
( 7) 2,2-bis[4-(2-aminobenzoyloxy)phenyl]propane
( 8) 2,2-bis[4-(2-N-acetylaminobenzoyloxy)phenyl]propane
( 9) 2,2-bis[4-(2-N-nonanoylaminobenzoyloxy)phenyl]propane
(10) bis[4-(2-aminobenzoyloxy)phenyl]sulfone
(11) bis[4-(2-N-acetylaminobenzoyloxy)phenyl]sulfone
(12) 4-methyl-2,2-bis[4-(2-aminobenzoyloxy)phenyl]pentane
(13) 4-methyl-2,2-bis[4-(2-N-acetylaminobenzoyloxy)phenyl]pentane
(14) 2,2-bis[3-chloro-4-(2-aminobenzoyloxy)phenyl]propane
(15) 2,2-bis[3-chloro-4-(2-N-acetylaminobenzoyloxy)phenyl]propane
(16) 2,2-bis[4-(4-N-stearoylaminobenzoyloxy)phenyl]propane
(17) 2,2-bis[4-(4-aminobenzoyloxy)phenyl]propane
(18) 2,2-bis[4-(4-N-tosylaminobenzoyloxy)phenyl]propane
(19) 2,2-bis[4-(2-N-methylaminobenzoyloxy)phenyl]propane
(20) 2,2-bis[4-(2-N-methyl-N-acetylaminobenzoyloxy)phenyl]propane
(21) 2,2-bis[4- 4-(N-dodecylbenzenesulfonylamino)benzoyloxy phenyl]propane.

Compounds having the structure (I), wherein $R_1$ and $R_2$ represent hydrogen or a lower alkyl group, may be obtained by reacting a compound having the structure (II):

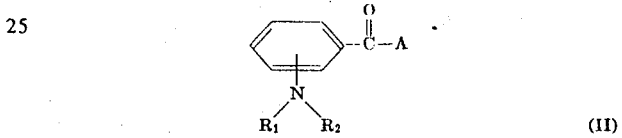

wherein
- $R_1$ and $R_2$ represent hydrogen or a lower alkyl group and
- A is halogen or a hydroxyl group, and compounds having the structure (III) or (IV):

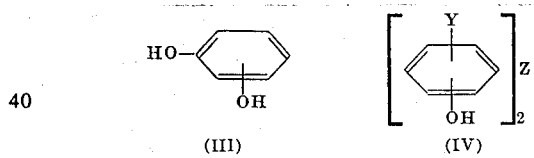

wherein
- Y is hydrogen or a halogen and
- Z represents a sulfonyl group or an alkylidene group having from three to eight carbon atoms, subsequently isolating the resulting compound having respectively the structure (V) or (VI):

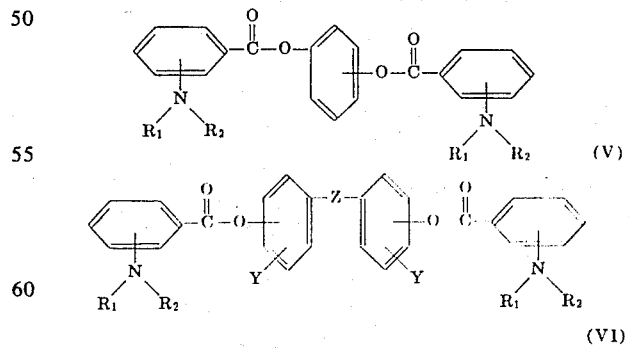

and, if desired, converting the same into the corresponding acid amide or sulfonamide.

Compounds according to the present invention with the amino group in the ortho position with respect to the ester carbonyl group may be advantageously obtained by starting from compounds having the structure (VII):

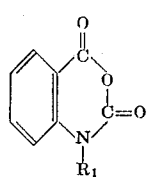

(VII)

wherein $R_1$ represents hydrogen or a lower alkyl group, and reacting the same with compounds having the structure (III) or (IV), subsequently isolating the resulting compounds formed having respectively the structure (VIII) or (IX) and, if desired, converting the same into the corresponding acid amide or sulfonamide.

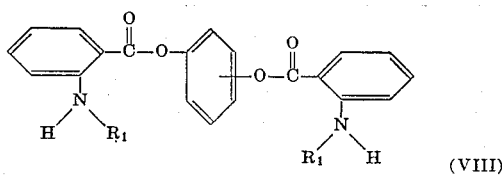

(VIII)

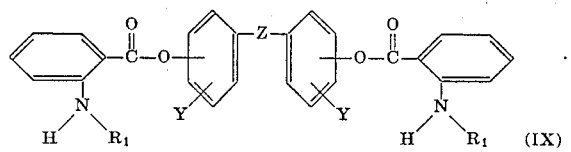

(IX)

The reaction of the compounds having the structure (II) or (VII) and the compounds having the structure (III) or (IV) is carried out in water or preferably in an organic solvent such as benzene, dioxane, ethylene glycol dimethyl ether, chloroform, carbon tetrachloride, hexane, petroleum ether, and at a temperature between 0°C. and the boiling point of the solvent used and, if desired, in the presence of alkaline compounds such as NaOH, pyridine or triethyl amine.

The compounds having the structures (V), (VI), (VIII) and (IX) may be isolated from the reaction mixture by filtering, decanting and/or distilling off the solvent. After purification by appropriate methods the compounds may be characterized by determining their physical constants such as melting point, refractive index and their characteristic infrared absorption bands.

As reaction components one may use alkylated or non-alkylated isatoic anhydride, alkylated or non-alkylated amino benzoic acid or alkylated or non-alkylated amino benzoyl chloride, bisphenol A, 4-methyl-2,2-bis(4-hydroxyphenyl)pentane, bis(4-hydroxyphenyl)sulfone, 2,2-bis(3-chloro-4-hydroxyphenyl)propane and resorcinol.

The amino benzoyl chlorides to be used may be obtained in a known manner by reacting the corresponding acids with chlorinating agents such as $POCl_3$, $PCl_3$, $PCl_5$ or $SOCl_2$.

The conversion of the compounds isolated from the reaction mixture, and having the structures (V), (VI), (VIII) and (IX), into the corresponding acid amides or sulfonamides may be carried out in a dry solvent such as benzene, carbon tetrachloride, chloroform, petroleum ether, hexane, diethyl ether, ethylene glycol dimethyl ether, dioxane, etc., and preferably in the presence of an alkaline substance such as an amine e.g., pyridine or triethyl amine.

As acylating or sulfonating agents one may use acetyl chloride, n-nonanoyl chloride, stearoyl chloride, benzoyl chloride, substituted benzoyl chloride, p-toluene sulfonyl chloride, p-dodecyl benzene sulfonyl chloride. In addition to acetyl chloride, ketene or acetic acid anhydride may be used as acetylating agent. After purification according to methods well known per se, the acylated or sulfonated compounds may be characterized by determining their physical constants such as melting point or refractive index and their characteristic infrared absorption bands.

The novel compounds according to the present invention may be homogeneously incorporated in the polymers to be stabilized, if desired in the presence of other additives such as plasticizers, pigments, heat stabilizers, lubricants, etc., by well known techniques such as mixing on the roll or calendering. They are incorporated in the polymer preferably in amounts of 0.1–5 percent by weight.

The following examples and tables further illustrate the invention. Where in these examples and tables reference is made to characteristic infrared absorption bands, these are given in microns.

EXAMPLE I 24.0 g of isatoic anhydride, 16.2 g of bisphenol A and 1.42 g of NaOH were heated in 50 ml of dioxane for 4.5 hours at 50°C. After cooling, the reaction mixture was poured into water, the precipitate was drawn off by suction, dried and re-crystallized with the aid of a mixture of acetone and water in a ratio of 5:1.

28.3 g of 2,2-bis[4-(2-aminobenzoyloxy)phenyl]propane were obtained having the structure (X):

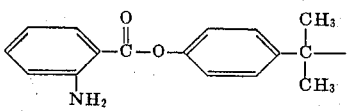

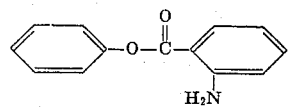

(X)

| | |
|---|---|
| Yield | 86% |
| M.P. | 196°–198°C. |
| Characteristic IR abs. { NH$_2$ band | 2.80/2.90 |
| C=O) ester band | 5.85 |

Starting from isatoic anhydride and various diphenols the compounds mentioned in the following Tables B and B' having the structure (XI) were obtained in an analogous way:

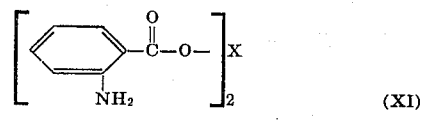

(XI)

TABLE B

| diphenol | base | solvent | Prod. No. (Table A) |
|---|---|---|---|
| resorcinol | NaOH | dioxane | (1) |
| 4-methyl-2,2-bis(4-hydroxyphenyl)pentane | NaOH | dioxane | (12) |
| bis(4-hydroxyphenyl)sulfone | NaOH | dioxane | (10) |
| 2,2-bis(3-chloro-4-hydroxyphenyl)propane | NaOH | dioxane | (14) |

TABLE B'

| Product No. (Table A) | X | physical constant °C | Characteristic IR absorption Bands |
|---|---|---|---|
| (1) | 1,3-$C_6H_4$ | m.p. 134°—136° | $NH_2$ 2,83/2.93 C=O ester 5.90 |
| (12) | 4,4'—$(C_6H_4)_2C(CH_3)CH_2$ $CH(CH_3)_2$ | resinous product | $NH_2$ 2.86/2.95 C=O ester 5.92 |
| (10) | 4,4'-$(C_6H_4)_2SO_2$ | m.p. 240°—247° | $NH_2$ 2.85/2.95 C=O ester 5.90 |
| (14) | 4,4'-$(C_6H_3Cl)_2C(CH_3)_2$ | m.p. 191°—192° | $NH_2$ 2.88/2.98 C=O ester 5.92 |

EXAMPLE II 54.8 g of p-aminobenzoic acid were heated under reflux with 120 ml of thionyl chloride for 2 hours and then the excess thionyl chloride was distilled off under reduced pressure. 45.6 g of bisphenol A were dissolved in absolute ethanol and reacted with 9.2 g of metallic sodium. After the alcohol had been distilled off under reduced pressure, the dry bis(sodium phenolate) was suspended in 500 ml of benzene. A solution of p-amino-benzoyl chloride prepared above in 250 ml of dry benzene was added to this suspension. The resulting mixture was heated for 45 minutes under nitrogen and under reflux.

After cooling, the precipitate was drawn off by suction, washed with 4 N sodium hydroxide and then with water to neutrality and recrystallized from an acetone-water mixture in a ratio of 1:1.

78.0 g of 2,2-bis[4-(4-aminobenzoyloxy)phenyl]propane were obtained having the structure (XII):

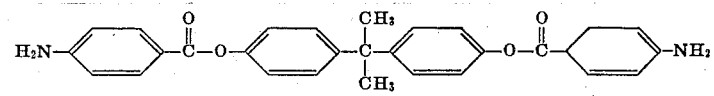

(XII)

| | |
|---|---|
| Yield | 84% |
| M.P. | 234°-242°C with decomposition |
| Characteristic IR abs. | $NH_2$ band 2,87/2.97 |
| | C=O ester band 5.90 |

EXAMPLE III

A solution of 10.44 g of 2,2-(bis[4-(2-aminobenzoyloxy)phenyl]propane, prepared in the way as described above in Example I, in 125 ml of chloroform was added to a solution of 4.71 g of acetyl chloride in 75 ml of dry chloroform. Subsequently the mixture was heated under reflux for 2 hours. After the chloroform had been distilled off, the residue was recrystallized from a mixture of chloroform and hexane in a ratio of 1:1.

11.8 g of 2,2-bis[4(2-N-acetylaminobenzoyloxy)phenyl]propane were obtained having the structure (XIII):

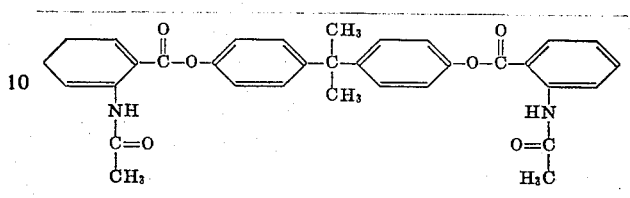

(XIII)

| | |
|---|---|
| Yield | 96% |
| M.P. | 321°-233°C. |
| Characteristic IR abs. | NH band 2.95 |
| | C=O ester band 5.80 |
| | C=O amide band 5.90 |

Starting from compounds described above in Example I and Table B, in an analogous way compounds mentioned in the Tables C and C' below, and having the structure (XIV) were obtained in the presence or absence of an alkaline substance.

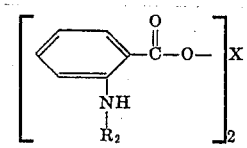

(XIV)

TABLE C

| Amino compound No. of Table A | acetylating agent | solvent | base | Product No. of Table A |
|---|---|---|---|---|
| (1) acetyl chloride | | chloroform | | (2) |
| (1) benzoyl chloride | | " | pyridine | (4) |
| (1) p-tert.butylbenzoyl chloride | | " | pyridine | (5) |
| (1) o-methoxybenzoyl chloride | | " | | (6) |
| (7) n-nonanoyl chloride | | " | | (9) |
| (10) acetyl chloride | | " | | (11) |
| (12) acetyl chloride | | " | | (13) |
| (14) acetyl chloride | | " | | (15) |

TABLE C'

| Product No. of Table A | $R_2$ | X | Physical constant | NH band | C=O ester band | C=O amide band |
|---|---|---|---|---|---|---|
| 2 | $COCH_3$ | 1,3-$C_6H_4$ | M.P. 176°-179° | 3.00 | 5.89 | 5.92 |
| 4 | $COC_6H_5$ | 1,3-$C_6H_4$ | M.P. 186°-189° | 2.99 | 5.90 | 6.00 |
| 5 | $COC_6H_4C(CH_3)_3$-p | 1,3-$C_6H_4$ | M.P. 203°-207° | 2.99 | 5.99 | 5.99 |
| 6 | $COC_6H_4OCH_3$-o | 1,3-$C_6H_4$ | M.P. 189°-193° | 3.02 | 5.84 | 6.02 |
| 9 | $COC_8H_{17}$-n | 4,4'-$(C_6H_4)_2C(CH_3)_2$ | Liquid $n_D^{20}$=1.4962 | 2.93 | 5.75 | 5.85 |
| 11 | $COCH_3$ | 4,4'-$(C_6H_4)_2SO_2$ | M.P. 142°-143° | 2.98 | 5.88 | 5.91 |
| 13 | $COCH_3$ | 4,4'-$(C_6H_4)_2C(CH_3)CH_2CH(CH_3)_2$ | Resinous product | 3.00 | 5.90 | 5.92 |
| 15 | $COCH_3$ | 4,4'-$(C_6H_3Cl)_2C(CH_3)_2$ | M.P. 216°-219° | 3.00 | 5.82 | 5.92 |

EXAMPLE IV 2,2-bis[4-(2-N-acetylaminobenzoyloxy)phenyl]propane having the structure (XIII) was also obtained by passing ketene into a solution of 20 g of the corresponding diamine in 200 ml of n-butyl acetate at 50°C. for 20 minutes. After the precipitate formed had been worked up in the way as described above in Example III, the end-product was obtained in a yield of 89%.

When acetylated with acetic anhydride in boiling benzene, the end-product was obtained in a yield of 70 percent.

EXAMPLE V 11.65 g of 2,2-bis[4-(4-aminobenzoyloxy)phenyl]propane obtained in the way described above in Example II, and 6 g of pyridine were dissolved in 100 ml of ethylene glycol dimethyl ether. 9.5 g of p-toluene sulfonyl chloride in 50 ml of ethylene glycol dimethyl ether were added to this solution and then the reaction mixture was heated under reflux for 3.5 hours. After cooling the mixture, the solvent was distilled off under reduced pressure. The residue was washed with 4 N hydrochloric acid and then with water to neutrality and subsequently dried. By recrystallization from a mixture of chloroform and petroleum ether in a ratio of 1 : 1, 14.1 g of 2,2-bis[4-(4-N-tosylaminobenzoyloxy)phenyl]propane were obtained having the structure (XV):

TABLE D

| Acylating agent | solvent | base | Product No. of Table A |
|---|---|---|---|
| stearoyl chloride | dioxane | | (16) |
| p-dodecylbenzenesulfonyl chloride | ethylene glycol dimethyl ether | pyridine | (21) |

TABLE D'

| Product No. of Table A | $R_2$ | Physical Constant | Characteristic IR abs. |
|---|---|---|---|
| (16) | $COC_{17}H_{35}$-n | m.p. 155°-160° | NH band 2.97; C=O ester band 5.82; C=O amide band 5.90. |
| (21) | $SO_2C_6H_4\cdot C_{12}H_{25}$-p | resinous product | NH band 3.05; C=O ester band 5.80; S=O band 7.54/8.64/10.95. |

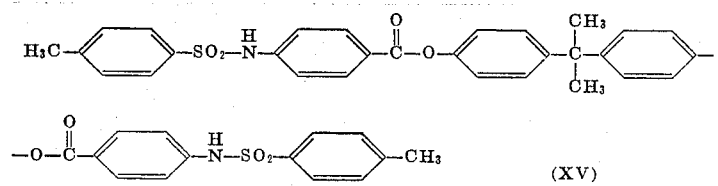

(XV)

Yield 73%
M.P. 247°–255°C. with decomposition
Characteristic IR abs. { NH band 3.05
C=O ester band 5.80
S=O band 7.53/8.64/10.95

Starting from 2,2-bis[4-(4-aminobenzoyloxy)phenyl]propane obtained in the way described above in Example II, in an analogous way the compounds mentioned in the following Tables D and D' having the structure (XVI) were obtained in the presence or absence of an alkaline substance.

EXAMPLE VI 5.31 g of N-methyl isatoic anhydride, 3.42 g of bisphenol A and 0.30 g of pulverulent NaOH were heated in 50 ml of dioxane for 8 hours at 100°C. After cooling, the reaction mixture was poured into hexane. The precipitate formed was drawn off by suction and subsequently dried.

5.19 g of 2,2-bis[4-(2-N-methylaminobenzoyloxy)phenyl]propane were obtained having the structure (XVII):

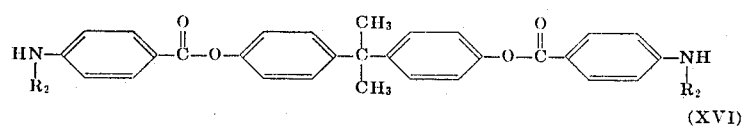

(XVI)

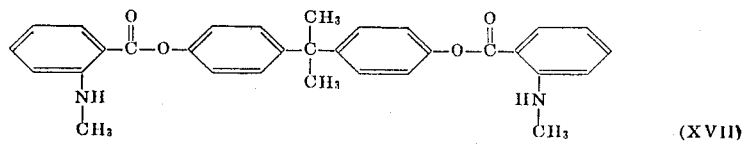

(XVII)

| | |
|---|---|
| Yield | 82% |
| M.P. | 187°–192°C. |
| Characteristic IR abs. { NH band | 2.92 |
| C=O ester band | 5.93 |

EXAMPLE VII 1.10 g of acetyl chloride dissolved in chloroform were added to 2.47 g of 2,2-bis[4-(2-N-methylaminobenzoyloxy)phenyl]propane, obtained in the way described above in Example VI, dissolved in 30 ml of chloroform. The mixture was then heated under reflux for 2 hours. After the chloroform had been distilled off, the residue was re-crystallized from a mixture of acetone and water in a ratio of 7:3.

2.08 g of 2,2-bis[4-(2-N-methyl-N-acetylaminobenzoyloxy)phenyl]hpropane were obtained having the structure (XVIII):

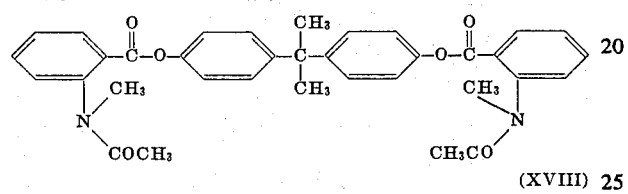

(XVIII)

| | |
|---|---|
| Yield | 72% |
| M.P. | 128°–132°C. |
| Characteristic IR abs. C=O ester band | 6.08 |

EXAMPLE VIII 33.0 g of m-N,N-dimethyl aminobenzoic acid were heated under nitrogen with 60 g of thionyl chloride for 3 hours at 50°C. After the excess thionyl chloride had been distilled off under reduced pressure, the residue was decolorized in a solution of chloroform with the aid of conventional absorption carbon. After the chloroform had been distilled off, 35.5 g of m-N,N-dimethyl aminobenzoyl chloride were obtained.

7.32 g of the product thus obtained, 2.20 g of resorcinol and 4.8 ml of pyridine were heated under nitrogen in 100 ml of chloroform for 4½hours at 60°C. After the mixture had been washed with 4 N hydrochloric acid and water to neutrality, the chloroform was dried and then the solvent was distilled off.

5.24 g of resorcinol bis(m-N,N-dimethyl aminobenzoate) were obtained having the structure (XIX):

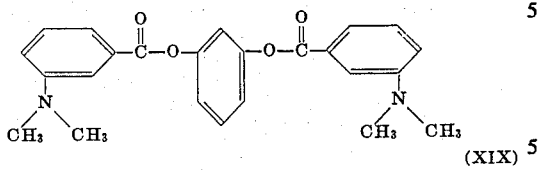

(XIX)

| | |
|---|---|
| Yield | $n_d^{20}$ = 1.5667 |
| Characteristic IR abs. | C=O ester band 5.82 |

EXAMPLE IX

One hundred g of polyvinylchloride, 35 g of dioctyl phthalate, 2 g of bariumcadmium stabilizer (Estabex BC-148) and 200 mg of 2,2-bis[4-(2-N-acetylaminobenzoyloxy)phenyl]on a roll at 180°C. until a homogeneous, colorless, transparent sheet was obtained. This sheet was pressed to a uniform thickness of 0.2 mm. Subsequently it was subjected to ultraviolet radiation in a Xenotester for 2000 hours. Next, the degradation was determined visually and rated according to a numerical scale ranging from 0 to 6, wherein the value 0 indicates that no degradation had taken place.

In an analogous way, the stabilizing power of other compounds according to the present invention was determined. The compounds used and the degradation as measured are listed below in Table E:

TABLE E

| Compound | Degradation (scale 0–6) |
|---|---|
| control sheet (blank) | 6 |
| 2,2-bis[4-(2-N-acetylaminobenzoyloxy)phenyl] propane | 1 |
| 2,2-bis[4-(2-aminobenzoyloxy)phenyl]propane | 3 |
| resorcinol di-anthranilate | 4 |
| resorcinol bis(N-acetylanthranilate) | 2 |
| bis[4-N-acetylaminobenzoyloxy)phenyl]sulfone | 2 |
| 2,2-bis[4-(2-N-acetylaminobenzoyloxy)-3-chlorophenyl] propane | 1 ½ |
| resorcinol bis[N-(2-methoxybenzoyl)anthranilate] | 2 |
| 2,2-bis[4-(4-aminobenzoyloxy)phenyl]propane | 1 |
| 2,2-bis[4-(4-N-tosylaminobezoyloxy)phenyl] propane | 1 ½ |

EXAMPLE X

One hundred g of high-density polyethylene were mixed with 250 mg of 2,2-bis[4-(4-N-stearoylaminobenzoul)phenyl]propane and worked on a roll into a colorless, transparent sheet at a temperature of 120°C. This sheet was pressed to a uniform thickness of 0.2 mm and subsequently subjected to ultraviolet radiation in a Xenotester for 2000 hours. As a measure of the degradation of the sheet the carbonyl content was determined. This content was 0.21. A non-stabilized sheet irradiated in an analogous way had a carbonyl content of 0.40.

What is claimed is:

1. A compound having the formula

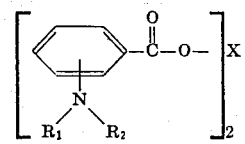

wherein
$R_1$ is hydrogen or a methyl group,
$R_2$ is hydrogen, a methyl group, an alkanoyl group having not more than 20 carbon atoms, an un-substituted or substituted benzoyl group having a substituent selected from an alkyl group having one to six carbon atoms, a methoxy group and a chloro atom, an unsubstituted benzene sulphonyl or benzene sulphonyl group substituted by an alkyl group having 1 to 12 carbon atoms; and
X is phenylene or a biphenyl fragment having the formula

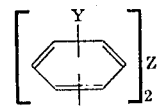

wherein
Y represents hydrogen or chloro, and
Z is an alkylidene group having from three to eight carbon atoms.

2. Resorcinol di-anthranilate.
3. Resorcinol bis(N-acetylanthranilate).
4. Resorcinol bis(m-N,N-dimethylaminobenzoate).
5. Resorcinol bis(N-benzoylanthranilate).
6. Resorcinol bis[N-(4tert.butylbenzoyl)anthranilate].
7. Resorcinol bis[N-(2-methoxybenzoyl)anthranilate].
8. 2,2-bis[4-(2-aminobenzoyloxy)phenyl]propane.
9. 2,2-bis[4-(2-N-acetylaminobenzoyloxy)phenyl]propane.
10. 2,2-bis[4-(2-N-nonanoylaminobenzoyloxy)phenyl]propane.
11. 4-methyl-2,2-bis[4-(2-aminobenzoyloxy)phenyl]pentane.
12. 4-methyl-2,2-bis[4-(2-N-acetylaminobenzoyloxy)phenyl]pentane.
13. 2,2-bis[3-chloro-4-(2-aminobenzoyloxy)phenyl]propane.
14. 2,2-bis[3-chloro-4-(2-N-acetylaminobenzoyloxy)phenyl]propane.
15. 2,2-bis[4-(4-N-stearoylaminobenzoyloxy)phenyl]propane.
16. 2,2-bis[4-(4-aminobenzoyloxy)phenyl]propane.
17. 2,2-bis[4-(4-N-tosylaminobenzoyloxy)phenyl]propane.
18. 2,2-bis[4-(2-N-methylaminobenzoyloxy)phenyl]propane.
19. 2,2-bis[4-(2-N-methyl-N-acetylaminobenzoyloxy)phenyl]propane.
20. 2,2-bis[4-{4-(N-dodecylbenzenesulfonylamino)benzoyloxy}phenyl]propane.

* * * * *